United States Patent
Dhori et al.

(10) Patent No.: US 12,482,518 B2
(45) Date of Patent: Nov. 25, 2025

(54) ENHANCED ACCURACY OF BIT LINE READING FOR AN IN-MEMORY COMPUTE OPERATION BY ACCOUNTING FOR VARIATION IN READ CURRENT

(71) Applicant: STMicroelectronics International N.V., Geneva (CH)

(72) Inventors: Kedar Janardan Dhori, Ghaziabad (IN); Nitin Chawla, Noida (IN); Promod Kumar, Greater Noida (IN); Harsh Rawat, Faridabad (IN); Manuj Ayodhyawasi, Noida (IN)

(73) Assignee: STMicroelectronics International N.V., Geneva (CH)

( * ) Notice: Subject to any disclaimer, the term of this patent is extended or adjusted under 35 U.S.C. 154(b) by 278 days.

(21) Appl. No.: 18/137,159

(22) Filed: Apr. 20, 2023

(65) Prior Publication Data

US 2023/0386564 A1 Nov. 30, 2023

Related U.S. Application Data

(60) Provisional application No. 63/345,558, filed on May 25, 2022.

(51) Int. Cl.
*G11C 7/10* (2006.01)
*G11C 11/408* (2006.01)
(Continued)

(52) U.S. Cl.
CPC ........ *G11C 11/4096* (2013.01); *G11C 7/1006* (2013.01); *G11C 11/4085* (2013.01);
(Continued)

(58) Field of Classification Search
CPC ............ G11C 11/4096; G11C 11/4085; G11C 11/4094; G11C 11/419; G11C 7/1006; G11C 11/54; G06N 3/065
See application file for complete search history.

(56) References Cited

U.S. PATENT DOCUMENTS 9,396,795 B1 7/2016 Jeloka et al.
10,860,682 B2 12/2020 Knag et al.
(Continued)

FOREIGN PATENT DOCUMENTS

WO 2022029790 A1 2/2022

OTHER PUBLICATIONS

EPO Search Report and Written Opinion for counterpart EP Appl. No. 23174859.1, report dated Nov. 8, 2023, 9 pgs.
(Continued)

*Primary Examiner* — Mushfique Siddique
(74) *Attorney, Agent, or Firm* — Crowe & Dunlevy LLC

(57) ABSTRACT

An in-memory computation circuit includes a memory array with SRAM cells connected in rows by word lines and in columns by bit lines. A row controller circuit simultaneously actuates word lines in parallel for an in-memory compute operation. A column processing circuit includes a read circuit that operates to reduce sensitivity to variation in bit line read current. Additionally, a testing circuit senses analog signals on the complementary bit lines to identify one of the complementary bit lines as having a less variable read current. That identified one of the complementary bit lines is coupled to the read circuit for the in-memory compute operation.

12 Claims, 8 Drawing Sheets

(51) Int. Cl.
    *G11C 11/4094*     (2006.01)
    *G11C 11/4096*     (2006.01)
    *G11C 11/419*     (2006.01)
    *G11C 11/54*     (2006.01)
    *G06N 3/065*     (2023.01)

(52) U.S. Cl.
    CPC ........ *G11C 11/4094* (2013.01); *G11C 11/419* (2013.01); *G11C 11/54* (2013.01); *G06N 3/065* (2023.01)

(56) References Cited

U.S. PATENT DOCUMENTS

| | | | | |
|---|---|---|---|---|
| 11,615,256 | B1* | 3/2023 | Far .................... | G06N 3/048 341/126 |
| 2019/0042160 | A1* | 2/2019 | Kumar ................ | G06F 3/0659 |
| 2019/0102170 | A1* | 4/2019 | Chen .................. | G11C 7/16 |
| 2021/0158854 | A1 | 5/2021 | Sinangil | |
| 2022/0012580 | A1* | 1/2022 | Srivastava ........... | G11C 11/412 |
| 2022/0027723 | A1 | 1/2022 | Kolter et al. | |
| 2022/0028444 | A1* | 1/2022 | Papageorgiou ...... | G06N 3/08 |
| 2022/0138545 | A1* | 5/2022 | Muthiah .............. | G06N 3/08 706/25 |
| 2022/0398438 | A1* | 12/2022 | Zhang ................. | G06F 7/5235 |

OTHER PUBLICATIONS

Lee Kyeongho et al Bit Parallel 6T SRAM 1-14 In-Memory Computing With Reconfigurable Bit-Precision 2020 57th ACM/IEEE Design Automation Conference (DAC), IEEE Jul. 20, 2020 pp. 1-6 XP033838070.

Jain Saurabh et al Broad-Purpose 1-14 In-Memory Computing for Signal Monitoring and Machine Learning Workloads IEEE Solid-State Circuits Letters, IEEE vol. 3, Sep. 17, 2020 pp. 394-397, XP011814078.

X. Si , "24.5 A Twin-8T SRAM Computation-In-Memory Macro for Multiple-Bit CNN-Based Machine Learning," IEEE International Solid-State Circuits Conference (ISSCC), 2019.

Area-Efficient and Variation-Tolerant In-Memory BNN Computing using 6T SRAM Array , Symposium on Circuits VLSI 2019.

X-SRAM: Enabling In-Memory Boolean Computations in CMOS Static Random Access Memories , IEEE Transactions on Circuits and Systems-I: Regular Papers, vol. 65, No. 12, Dec. 2018.

M. Kang et al., "A Multi-Functional In-Memory Inference Processor Using a Standard 6T SRAM Array," IEEE Journal of Solid-State Circuits, vol. 53, No. 2, 2018.

J. Zhang et al., "In-memory computation of a machine-learning classifier in a standard 6T SRAM array," IEEE Journal of Solid-State Circuits, vol. 52, No. 4, 2017.

A. Biswas and A. P. Chandrakasan, "CONV-SRAM: An Energy-Efficient SRAM with In-Memory Dot-Product Computation for Low-Power Convolutional Neural Networks," IEEE Journal of Solid-State Circuits (JSSC), vol. 54, No. 1, 2019.

X. Si et al., "A 28nm 64Kb 6T SRAM Computing-in-Memory Macro with 8b MAC Operation for AI Edge Chips," IEEE International Solid-State Circuits Conference (ISSCC), 2020.

J.-W. Su et al., "A 28nm 64Kb Inference-Training Two-Way Transpose Multibit 6T SRAM Compute-in-Memory Macro for AI Edge Chips," IEEE International Solid-State Circuits Conference (ISSCC), 2020.

S. Yin et al., "XNOR-SRAM: In-Memory Computing SRAM Macro for Binary/Ternary Deep Neural Networks," IEEE Journal of Solid-State Circuits (JSSC), vol. 55, No. 6, 2020.

H. Jia et al., "A Programmable Heterogeneous Microprocessor Based on Bit-Scalable In-Memory Computing," in IEEE Journal of Solid-State Circuits, vol. 55, No. 9, 2020.

Z. Jiang et al., "C3SRAM: An In-Memory-Computing SRAM Macro Based on Robust Capacitive Coupling Computing Mechanism," IEEE Journal of Solid-State Circuits (JSSC), vol. 55, No. 7, 2020.

H. Valavi et al., "A 64-Tile 2.4-Mb In-Memory-Computing CNN Accelerator Employing Charge-Domain Compute," IEEE Journal of Solid-State Circuits, vol. 54, No. 6, 2019.

Q. Dong , "A 351TOPS/W and 372.4GOPS Compute-in-Memory SRAM Macro in 7nm FinFET CMOS for Machine-Learning Applications," IEEE International Solid-State Circuits Conference (ISSCC), 2020.

Aga, Shaizeen, et al: "Compute Caches," 2017 IEEE International Symposium on High Performance Computer Architecture, 12 pages.

Chen, Zhiyu, et al: "CAP-RAM: A Charge-Domain In-Memory Computing 6T-SRAM for Accurate and Precision-Programmable CNN Inference," IEEE Journal of Solid-State Circuits, 2021, 12 pages.

Jeloka, Supreet, et al: "A 28 nm Configurable Memory (TCAM/BCAM/SRAM) Using Push-Rule 6T Bit Cell Enabling Logic-in-Memory," IEEE Journal of Solid-State Circuits, vol. 51, No. 4, Apr. 2016, 13 pages.

Kang, Mingu, et al: "A Multi-functional In-memory Inference Processor using a Standard 6T SRAM Array," IEEE, 2017, 17 pages.

Mittal, Sparsh, et al: "A Survey of SRAM-based In-Memory Computing Techniques and Applications," Journal of Systems Architecture, Aug. 2021, 55 pages.

Sun, Xiaoyu, et al: "Computing-in-Memory with SRAM and RRAM for Binary Neural Networks," 2018 IEEE, 4 pages.

Zhang, Jiantao, et al: "In-Memory Computation of a Machine-Learning Classifier in a Standard 6T SRAM Array," IEEE Journal of Solid-State Circuits, 2017, 10 pages.

* cited by examiner

ENHANCED ACCURACY OF BIT LINE READING FOR AN IN-MEMORY COMPUTE OPERATION BY ACCOUNTING FOR VARIATION IN READ CURRENT

CROSS REFERENCE TO RELATED APPLICATIONS

This application claims priority from United States Provisional Application for Patent No. 63/345,558, filed May 25, 2022, the disclosure of which is incorporated herein by reference.

TECHNICAL FIELD

Embodiments relate to an in-memory computation circuit utilizing a static random access memory (SRAM) array and, in particular, to a read circuit and self-test circuit providing enhanced read accuracy by accounting for variation in read current during a simultaneous access of multiple rows of the SRAM array for an in-memory compute operation.

BACKGROUND

Reference is made to FIG. 1 which shows a schematic diagram of an in-memory computation circuit 10. The circuit 10 utilizes a static random access memory (SRAM) array 12 formed by standard 6T SRAM memory cells 14 arranged in a matrix format having N rows and M columns. As an alternative, a standard 8T memory cell or an SRAM with a similar functionality and topology could instead be used. Each memory cell 14 is programmed to store a bit of a computational weight or kernel data for an in-memory compute operation. In this context, the in-memory compute operation is understood to be a form of a high dimensional Matrix Vector Multiplication (MVM) supporting multi-bit weights that are stored in multiple bit cells of the memory. The group of bit cells (in the case of a multibit weight) can be considered as a virtual synaptic element. Each bit of the computational weight has either a logic "1" or a logic "0" value.

Each SRAM cell 14 includes a word line WL and a pair of complementary bit lines BLT and BLC. The 8T-type SRAM cell would additionally include a read word line RWL and a read bit line BLR. The cells 14 in a common row of the matrix are connected to each other through a common word line WL (and through the common read word line RWL in the 8T-type implementation). The cells 14 in a common column of the matrix are connected to each other through a common pair of complementary bit lines BLT and BLC (and through the common read bit line BLR in the 8T-type implementation). Each word line WL, RWL is driven by a word line driver circuit 16 which may be implemented as a CMOS driver circuit (for example, a series connected p-channel and n-channel MOSFET transistor pair forming a logic inverter circuit). The word line signals applied to the word lines, and driven by the word line driver circuits 16, are generated from feature data input to the in-memory computation circuit and controlled by a row controller circuit 18. A column processing circuit 20 senses the analog signals on the pairs of complementary bit lines BLT and BLC (and/or on the read bit line BLR) for the M columns and generates a decision output for the in-memory compute operation from those analog signals. The column processing circuit 20 can be implemented to support processing where the analog signals on the columns are first processed individually and then followed by a recombination of multiple column outputs.

Although not explicitly shown in FIG. 1, it will be understood that the circuit 10 further includes conventional row decode, column decode, and read-write circuits known to those skilled in the art for use in connection with writing bits of the computational weight to, and reading bits of the computational weight from, the SRAM cells 14 of the memory array 12.

With reference now to FIG. 2, each memory cell 14 includes two cross-coupled CMOS inverters 22 and 24, each inverter including a series connected p-channel and n-channel MOSFET transistor pair. The inputs and outputs of the inverters 22 and 24 are coupled to form a latch circuit having a true data storage node QT and a complement data storage node QC which store complementary logic states of the stored data bit. The cell 14 further includes two transfer (passgate) transistors 26 and 28 whose gate terminals are driven by a word line WL. The source-drain path of transistor 26 is connected between the true data storage node QT and a node associated with a true bit line BLT. The source-drain path of transistor 28 is connected between the complement data storage node QC and a node associated with a complement bit line BLC. The source terminals of the p-channel transistors 30 and 32 in each inverter 22 and 24 are coupled to receive a high supply voltage (for example, Vdd) at a high supply node, while the source terminals of the n-channel transistors 34 and 36 in each inverter 22 and 24 are coupled to receive a low supply voltage (for example, ground (Gnd) reference) at a low supply node. While FIG. 2 is specific to the use of 6T-type cells, those skilled in the art recognize that the 8T-type cell is similarly configured and would further include a signal path that is coupled to one of the storage nodes and includes a transfer (passgate) transistor coupled to the read bit line BLR and gate driven by the signal on the read word line RWL. The word line driver circuit 16 is also typically coupled to receive the high supply voltage (Vdd) at the high supply node and is referenced to the low supply voltage (Gnd) at the low supply node.

The row controller circuit 18 performs the function of selecting which ones of the word lines WL<0> to WL<N−1> are to be simultaneously accessed (or actuated) in parallel during an in-memory compute operation, and further functions to control application of pulsed signals to the word lines in accordance with the feature data for that in-memory compute operation. FIG. 1 illustrates, by way of example only, the simultaneous actuation of all N word lines with the pulsed word line signals, it being understood that in-memory compute operations may instead utilize a simultaneous actuation of fewer than all rows of the SRAM array. The analog signals on a given pair of complementary bit lines BLT and BLC (or on the read bit line RBL in the 8T-type implementation) are dependent on the logic state of the bits of the computational weight stored in the memory cells 14 of the corresponding column and the width(s) of the pulsed word line signals applied to those memory cells 14.

The implementation illustrated in FIG. 1 shows an example in the form of a pulse width modulation (PWM) for the applied word line signals for the in-memory compute operation. The use of PWM or period pulse modulation (PTM) for the applied word line signals is a common technique used for the in-memory compute operation based on the linearity of the vector for the multiply-accumulation (MAC) operation. The pulsed word line signal format can be further evolved as an encoded pulse train to manage block sparsity of the feature data of the in-memory compute operation. It is accordingly recognized that an arbitrary set of encoding schemes for the applied word line signals can be used when simultaneously driving multiple word lines in response to the received feature data. Furthermore, in a simpler implementation, it will be understood that all applied word line signals in the simultaneous actuation may instead have a same pulse width.

FIG. 3 is a timing diagram showing simultaneous application of the example pulse width modulated word line signals to plural rows of memory cells 14 in the SRAM array 12 for a given in-memory compute operation, and the development over time of voltages Va,T and Va,C on one corresponding pair of complementary bit lines BLT and BLC, respectively. The voltage Va is dependent on a bit line read current ($I_R$) whose magnitude is a sum of the memory cell currents $I_{CELL}$ and dependent on the pulse width(s) of the word line signals due to the feature data and the logic state of the bits of the computational weight stored in the memory cells 14. The representation of the voltage Va levels as shown is just an example. After completion of the computation cycle of the in-memory compute operation, the voltage Va levels return to the bit line precharge Vdd level.

Those skilled in the art recognize that there can be a high degree of variability on the output voltage Va levels due to variation in the memory cell current $I_{CELL}$ and the corresponding bit line read current $I_R$. This variation in current adversely affects measurement accuracy for the in-memory compute operation. There would be an advantage if read circuitry for the in-memory compute operation could account for bit line (read) current variation. It would be also an advantage if the less variable bit line of a given column could be identified and subsequently selected for use in the read operation.

SUMMARY

In an embodiment, an in-memory computation circuit comprises: a memory array including a plurality of static random access memory (SRAM) cells arranged in a matrix with plural rows and plural columns, each row including a word line connected to the SRAM cells of the row, and each column including a first bit line and second bit line connected to the SRAM cells of the column; a word line driver circuit for each row having an output connected to drive the word line of the row; a row controller circuit configured to simultaneously actuate the plurality of word lines by applying pulses through the word line driver circuits to the word lines for an in-memory compute operation; and a column processing circuit including a read circuit coupled to the first and second bit lines.

Each read circuit comprises: a first voltage sensing circuit configured to sense a first bit line voltage generated on the first bit line in response to the in-memory compute operation and generate a first sense signal; a second voltage sensing circuit configured to sense a second bit line voltage generated on the second bit line in response to the in-memory compute operation and generate a second sense signal; and a processing circuit configured to average the first and second sense signals to generate an output signal indicative of a result of the in-memory compute operation.

The first voltage sensing circuit comprises a first analog-to-digital converter circuit configured to implement a first encoding operation. The second voltage sensing circuit comprises a second analog-to-digital converter circuit configured to implement a second encoding operation. The second encoding operation is a logical inversion of the first encoding operation.

In an embodiment, a read method is presented for an in-memory computation circuit including: a memory array including a plurality of static random access memory (SRAM) cells arranged in a matrix with plural rows and plural columns, each row including a word line connected to the SRAM cells of the row, and each column including a first bit line and second bit line connected to the SRAM cells of the column; a word line driver circuit for each row having an output connected to drive the word line of the row; and a row controller circuit configured to simultaneously actuate the plurality of word lines by applying pulses through the word line driver circuits to the word lines for an in-memory compute operation. The read method comprises: sensing a first bit line voltage generated on the first bit line in response to the in-memory compute operation to generate a first sense signal; sensing a second bit line voltage generated on the second bit line in response to the in-memory compute operation to generate a second sense signal; and averaging the first and second sense signals to generate an output signal indicative of a result of the in-memory compute operation.

Sensing the first bit line voltage comprises performing a first analog-to-digital conversion using a first encoding operation. Sensing the second bit line voltage comprises performing a second analog-to-digital conversion using a second encoding operation. The second encoding operation is a logical inversion of the first encoding operation.

In an embodiment, an in-memory computation circuit comprises: a memory array including a plurality of static random access memory (SRAM) cells arranged in a matrix with plural rows and plural columns, each row including a word line connected to the SRAM cells of the row, and each column including a first bit line and second bit line connected to the SRAM cells of the column; a word line driver circuit for each row having an output connected to drive the word line of the row; a row controller circuit configured to simultaneously actuate the plurality of word lines by applying pulses through the word line driver circuits to the word lines for an in-memory compute operation; a column processing circuit including a read circuit for each column; and a testing circuit configured to identify which one of the first and second bit lines in each column has a less variable read current and couple the identified one of the first and second bit lines to the read circuit for the in-memory compute operation.

The testing circuit identifies which one of the first and second bit lines in each column has the less variable read current by comparing analog read signals (currents/voltages) on the first and second bit lines to a threshold window defined between first and second threshold values.

In an embodiment, a testing method is presented for an in-memory computation circuit including: a memory array including a plurality of static random access memory (SRAM) cells arranged in a matrix with plural rows and plural columns, each row including a word line connected to the SRAM cells of the row, and each column including a first bit line and second bit line connected to the SRAM cells of the column; a word line driver circuit for each row having an output connected to drive the word line of the row; a row controller circuit configured to simultaneously actuate the plurality of word lines by applying pulses through the word line driver circuits to the word lines for an in-memory compute operation, and a read circuit for each column. The testing method comprises: programming memory cells of a column to a first logic state; sequentially driving the word lines for the rows of the column; first comparing an analog signal generated on the first bit line in response to each word line driver to a threshold window; incrementing a first count value in response to a result of the first comparing; programming memory cells of the column to a second logic state opposite the first logic state; sequentially driving the word lines for the rows of the column; second comparing an analog signal generated on the second bit line in response to each word line driver to the threshold window; incrementing a second count value in response to a result of the second comparing; and identifying one of the first and second bit lines as having a less variable read current based on a comparison of the first and second count values.

The identified one of the first and second bit lines is coupled to the read circuit for the in-memory compute operation.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
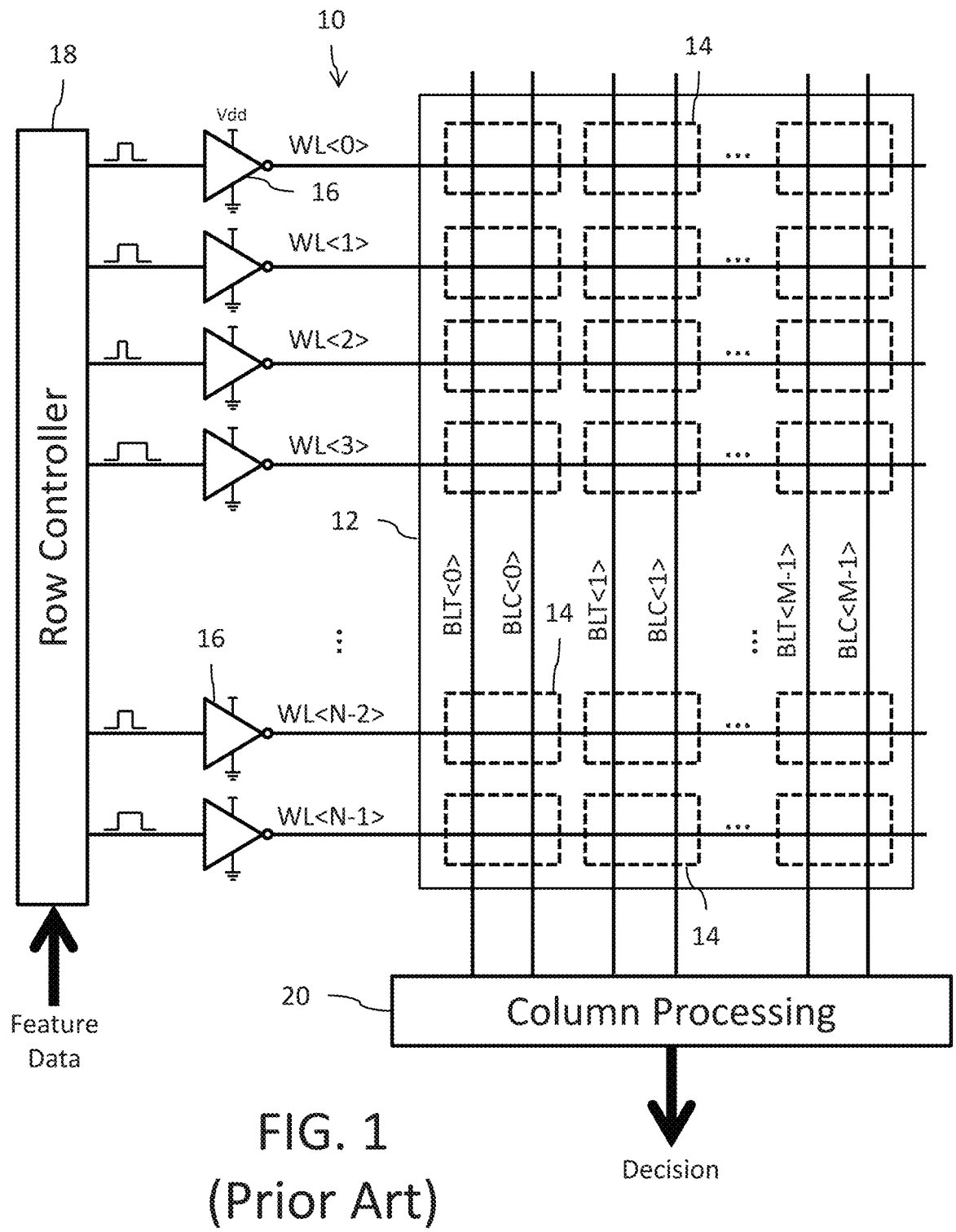
FIG. 1 is a schematic diagram of an in-memory computation circuit.
Figure 2:
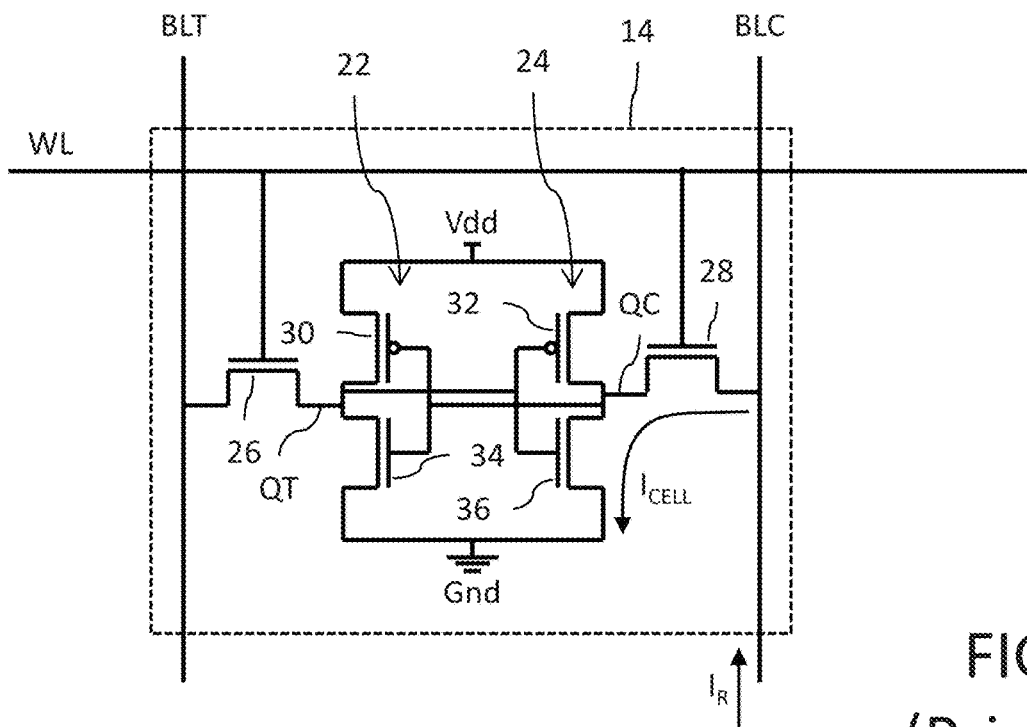
FIG. 2 is a circuit diagram of a standard 6T static random access memory (SRAM) cell as used the memory array of the in-memory computation circuit shown in FIG. 1.
Figure 3:
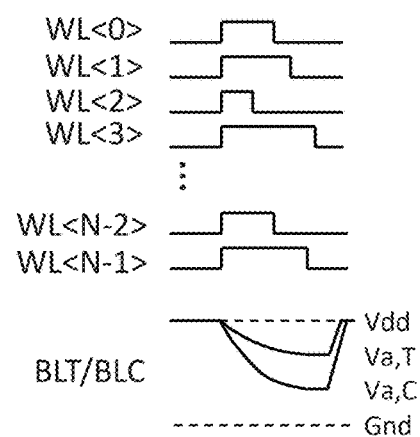
FIG. 3 is a timing diagram illustrating an in-memory compute operation.
Figure 4:
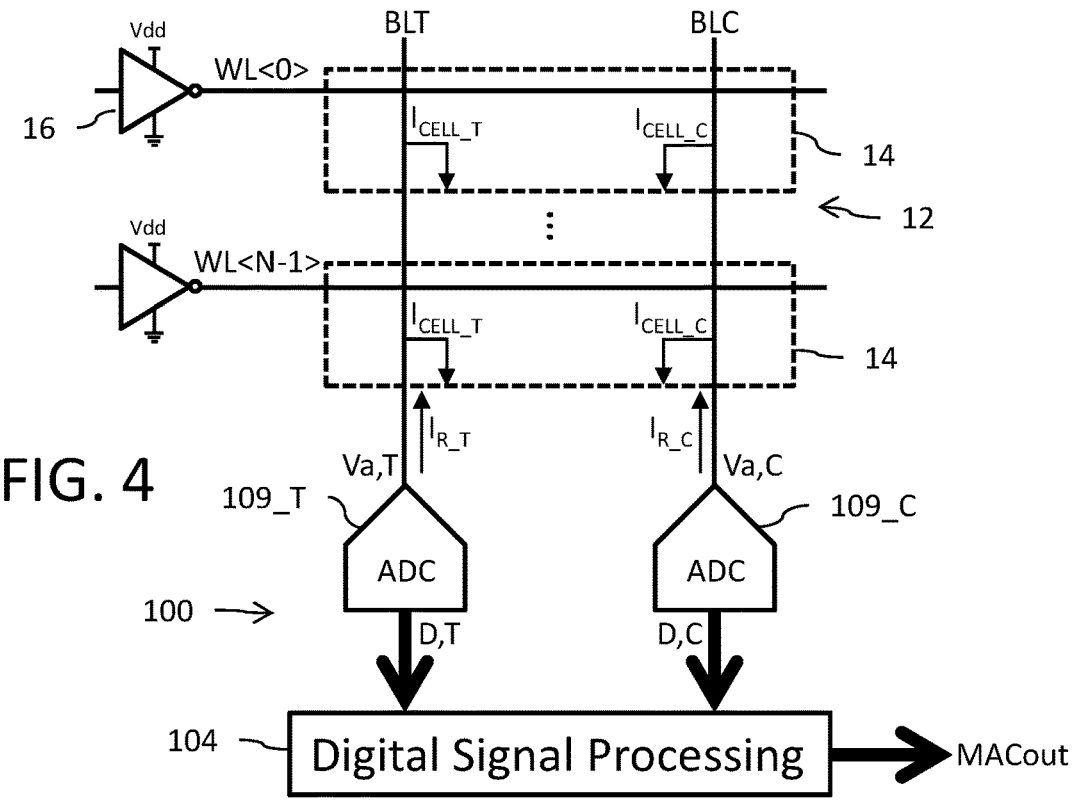
FIG. 4 is a circuit diagram for a bit line read circuit.

Reference is now made to FIG. 4 which shows a circuit diagram for a bit line read circuit 100 used within the column processing circuit 20. Like references in FIGS. 1 and 4 refer to like or similar components. The true bit line BLT for a given column of memory cells 14 in the array 12 is coupled, preferably directly connected, to a true voltage sensing circuit 109_T. In a preferred embodiment, the true voltage sensing circuit 109_T comprises an analog-to-digital converter (ADC) circuit. The ADC voltage sensing circuit 109_T operates to convert the analog voltage Va,T on the true bit line BLT to generate a corresponding digital data signal D,T. Similarly, the complement bit line BLC for that given column of memory cells 14 in the array 12 is coupled, preferably directly connected, to a complement voltage sensing circuit 109_C. In a preferred embodiment, the complement voltage sensing circuit 109_C comprises an ADC circuit. The ADC voltage sensing circuit 109_C operates to convert the analog voltage Va,C on the complement bit line BLC to generate a corresponding digital data signal D,C. The digital data signals D,T and D,C are input to a digital signal processing (DSP) circuit 104 for application of data post processing operations which result in the generation of a digital output signal MACout representative of a result of the column multiply-accumulate (MAC) for the in-memory compute operation. The digital signals MACout from each column may be output as the Decision from the column processing circuit 20 or combined with each other to generate the Decision.

The encoding operations performed by the ADC voltage sensing circuits 109_T and 109_C are logically inverted. To better understand this concept of logically inverted encoding operations, consider the following table illustrating the encoding operation for a non-limiting example embodiment of the ADC voltage sensing circuit 109_T as a 2-bit ADC where the digital data signal D,T is formed by output bits Q0 and Q1:

| Analog Input | Digital Output D, T | |
|---|---|---|
| Voltage Va, T | Q1 | Q0 |
| 0 V to 0.25 V | 0 | 0 |
| 0.26 V to 0.5 V | 0 | 1 |
| 0.51 V to 0.75 V | 1 | 0 |
| 0.76 V to 1.0 V | 1 | 1 |

Now consider the following table illustrating the encoding operation for a non-limiting example embodiment of the ADC voltage sensing circuit 109_C as a 2-bit ADC where the digital data signal D,C is formed by output bits Q0 and Q1:

| Analog Input | Digital Output D, C | |
|---|---|---|
| Voltage Va, C | Q1 | Q0 |
| 0 V to 0.25 V | 1 | 1 |
| 0.26 V to 0.5 V | 1 | 0 |
| 0.51 V to 0.75 V | 0 | 1 |
| 0.76 V to 1.0 V | 0 | 0 |

Thus, for an analog input voltage Va input in a same range (for example, 0.26V to 0.5V), the digital outputs of the ADC voltage sensing circuits 109_T and 109_C will have logically inverted data bits (i.e., D,T=<0,1> for ADC voltage sensing circuit 109_T and D,C=<1,0> for ADC voltage sensing circuit 109_C).

In an embodiment, the data post processing operation performed by the DSP circuit 104 is an averaging of the two digital data signals D,T and D,C (i.e., MACout=(D,T+D,C)/2). The effect of the logical inversion of the encoding operations for analog to digital conversion of the voltage on the complementary bit lines BLT, BLC and the averaging of the digital values produced by the ADC voltage sensing circuits 109 is to generate the digital output signal MACout having reduced sensitivity to variation in bit line read current.

It will be understood that one bit line read circuit 100 is provided in the column processing circuit 20 for each column of the memory.

Operation of the bit line read circuit 100 is as follows: At a beginning of a computation cycle for an in-memory compute operation, the complementary bit lines BLT, BLC are precharged to the Vdd voltage level. Simultaneous application of word line signals for the in-memory compute operation is then made to plural rows of memory cells 14 in the SRAM array 12 and true and complement read currents $I_{R\_T}$, $I_{R\_C}$ develop on the complementary bit lines BLT, BLC. The magnitudes of the read currents $I_{R\_T}$, $I_{R\_C}$ are a function of a sum of the currents $I_{CELL}$ sunk to ground by the memory cells 14 of the column which participate in the in-memory compute operation. The read currents $I_{R\_T}$, $I_{R\_C}$ discharge the complementary bit lines BLT, BLC from the precharge Vdd voltage level and the bit line voltages Va,T and Va,C develop. The ADC voltage sensing circuits 109_T, 109_C sample and convert the analog voltages Va,T and Va,C, respectively, to digital data signals D,T and D,C using logically inverted encoding operations (as described above). Post processing by the DSP circuit 104 averages the digital data signals D,T and D,C to generate the digital output signal MACout. After completion of the computation cycle of the in-memory compute operation, the voltage Va levels on the complementary bit lines BLT, BLC return to the bit line precharge Vdd level.

Figure 5:
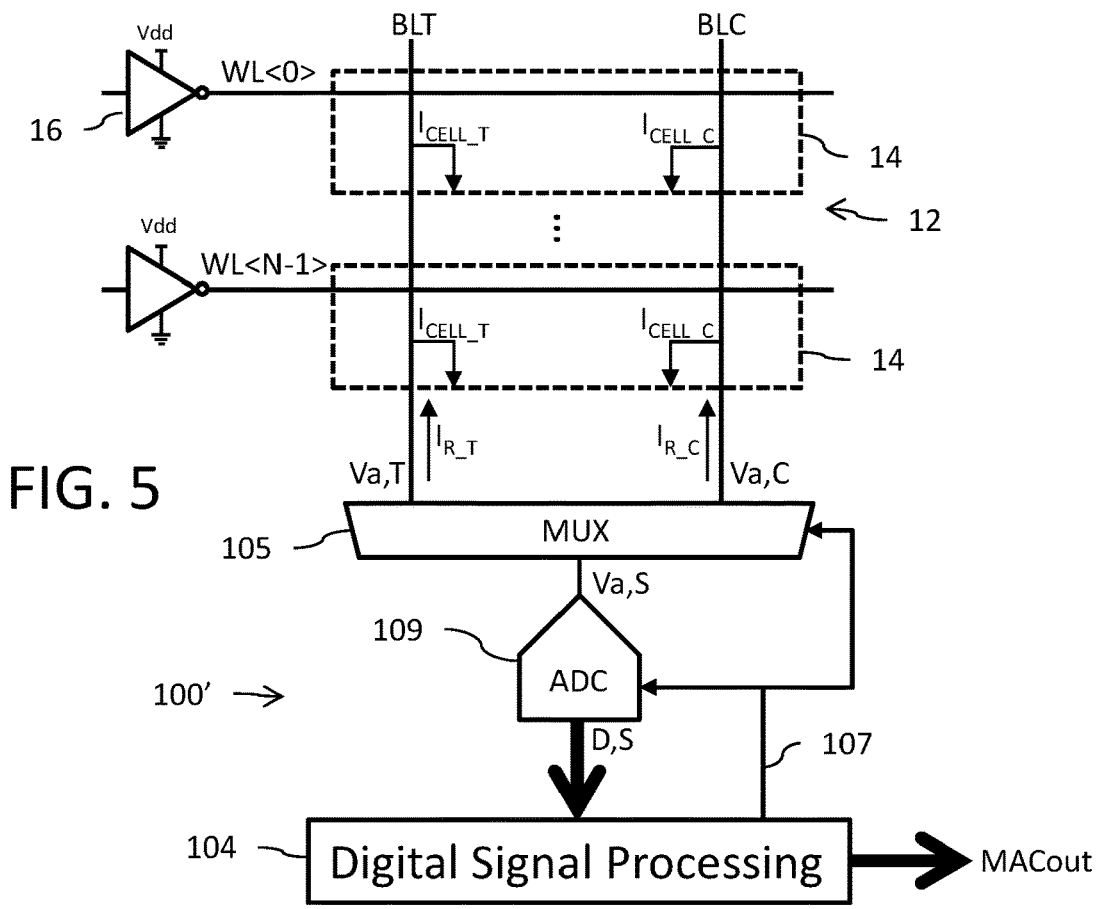
FIG. 5 is a circuit diagram for an alternative embodiment of the bit line read circuit.

Reference is now made to FIG. 5 which shows a circuit diagram for an alternative embodiment for the bit line read circuit 100' used within the column processing circuit 20. Again, like references in FIGS. 1, 4 and 5 refer to like or similar components. The true bit line BLT for a given column of memory cells 14 in the array 12 is coupled, preferably directly connected, to a first input of an analog multiplexer (MUX) circuit 105. Similarly, the complement bit line BLC for that given column of memory cells 14 in the array 12 is coupled, preferably directly connected, to a second input of the analog MUX circuit 105. The analog MUX circuit 105 functions in response to a control signal 107 to select between the analog voltage Va,T on the true bit line BLT and the analog voltage Va,C on the complement bit line BLC for output as the selected analog voltage Va,S. The output of the analog MUX circuit 105 is coupled, preferably directly connected, to the input of a voltage sensing circuit 109. In a preferred embodiment, the voltage sensing circuit 109 comprises an analog-to-digital converter (ADC) circuit. The ADC voltage sensing circuit 109 operates to convert the selected analog voltage Va,S output from the MUX circuit 105 to generate a corresponding digital data signal D,S. The digital data signal D,S is input to a digital signal processing (DSP) circuit 104 for application of data post processing operations which result in the generation of a digital output signal MACout representative of a result of the column multiply-accumulate (MAC) for the in-memory compute operation. The digital signals MACout from each column may be output as the Decision from the column processing circuit 20 or combined with each other to generate the Decision.

The ADC voltage sensing circuit 109 is configurable through the control signal 107 to selectively implement logically inverted encoding operations. When the control signal 107 has a first logic state, and the MUX circuit 105 selectively passes the analog voltage Va,T on the true bit line BLT for the analog voltage Va,S, the ADC voltage sensing circuit 109 is configured to implement a first encoding operation as generally illustrated in the following table for a non-limiting example embodiment as a 2-bit ADC where the digital data signal D,S is formed by output bits Q0 and Q1:

| Analog Input | Digital Output D, S | | Signal 107 |
|---|---|---|---|
| Voltage Va, S | Q1 | Q0 | |
| 0 V to 0.25 V | 0 | 0 | $1^{st}$ state |
| 0.26 V to 0.5 V | 0 | 1 | $1^{st}$ state |
| 0.51 V to 0.75 V | 1 | 0 | $1^{st}$ state |
| 0.76 V to 1.0 V | 1 | 1 | $1^{st}$ state |

Conversely, when the control signal 107 has a second logic state, and the MUX circuit 105 selectively passes the analog voltage Va,C on the complement bit line BLC for the analog voltage Va,S, the ADC voltage sensing circuit 109 is configured to implement a second encoding operation as generally illustrated in the following table for a non-limiting example embodiment as a 2-bit ADC where the digital data signal D,S is formed by output bits Q0 and Q1:

| Analog Input | Digital Output D, S | | Signal 107 |
|---|---|---|---|
| Voltage Va, S | Q1 | Q0 | |
| 0 V to 0.25 V | 1 | 1 | $2^{nd}$ state |
| 0.26 V to 0.5 V | 1 | 0 | $2^{nd}$ state |
| 0.51 V to 0.75 V | 0 | 1 | $2^{nd}$ state |
| 0.76 V to 1.0 V | 0 | 0 | $2^{nd}$ state |

The two digital data signals D,S (representative of the analog voltages Va,T and Va,C) are stored by the DSP circuit 104. In an embodiment, the data post processing operation performed by the DSP circuit 104 is an averaging of the two digital data signals D,S. The effect of the logical inversion of the encoding operations for analog to digital conversion and the averaging of the digital values produced by the ADC voltage sensing circuit 109 is to generate the digital output signal MACout having reduced sensitivity to variation in read current.

It will be understood that one bit line read circuit 100 is provided in the column processing circuit 20 for each column of the memory.

Operation of the bit line read circuit 100' is as follows: At a beginning of a computation cycle for an in-memory compute operation, the complementary bit lines BLT, BLC are precharged to the Vdd voltage level. Simultaneous application of word line signals for the in-memory compute operation is then made to plural rows of memory cells 14 in the SRAM array 12 and true and complement read currents $I_{R\_T}$, $I_{R\_C}$ develop on the complementary bit lines BLT, BLC. The magnitudes of the read currents $I_{R\_T}$, $I_{R\_C}$ are a function of a sum of the currents $I_{CELL}$ sunk to ground by the memory cells 14 of the column which participate in the in-memory compute operation. The read currents $I_{R\_T}$, $I_{R\_C}$ discharge the complementary bit lines BLT, BLC from the precharge Vdd voltage level and the bit line voltages Va,T and Va,C develop. With the control signal 107 in the first logic state, the MUX circuit 105 selectively passes the analog voltage Va,T on the bit line BLT (as the select voltage Va,S) and the ADC voltage sensing circuit 109 samples and converts the analog voltage Va,T to a first digital data signal D,S(1) using the first encoding operation. The first digital data signal D,S(1) is saved in the DSP circuit 104. The control signal 107 is then switched to the second logic state and the MUX circuit 105 selectively passes the analog voltage Va,C on the bit line BLC (as the select voltage Va,S) and the ADC voltage sensing circuit 109 samples and converts the analog voltage Va,C to a second digital data signal D,S(2) using the second (logically inverted) encoding operation. The second digital data signal D,S(2) is also saved in the DSP circuit 104. Post processing by the DSP circuit 104 averages the two digital data signals D,S to generate the digital output signal MACout (i.e., MACout=(D,S(1)+D,S(2))/2). After completion of the computation cycle of the in-memory compute operation, the voltage Va levels on the complementary bit lines BLT, BLC return to the bit line precharge Vdd level.

Figure 6:
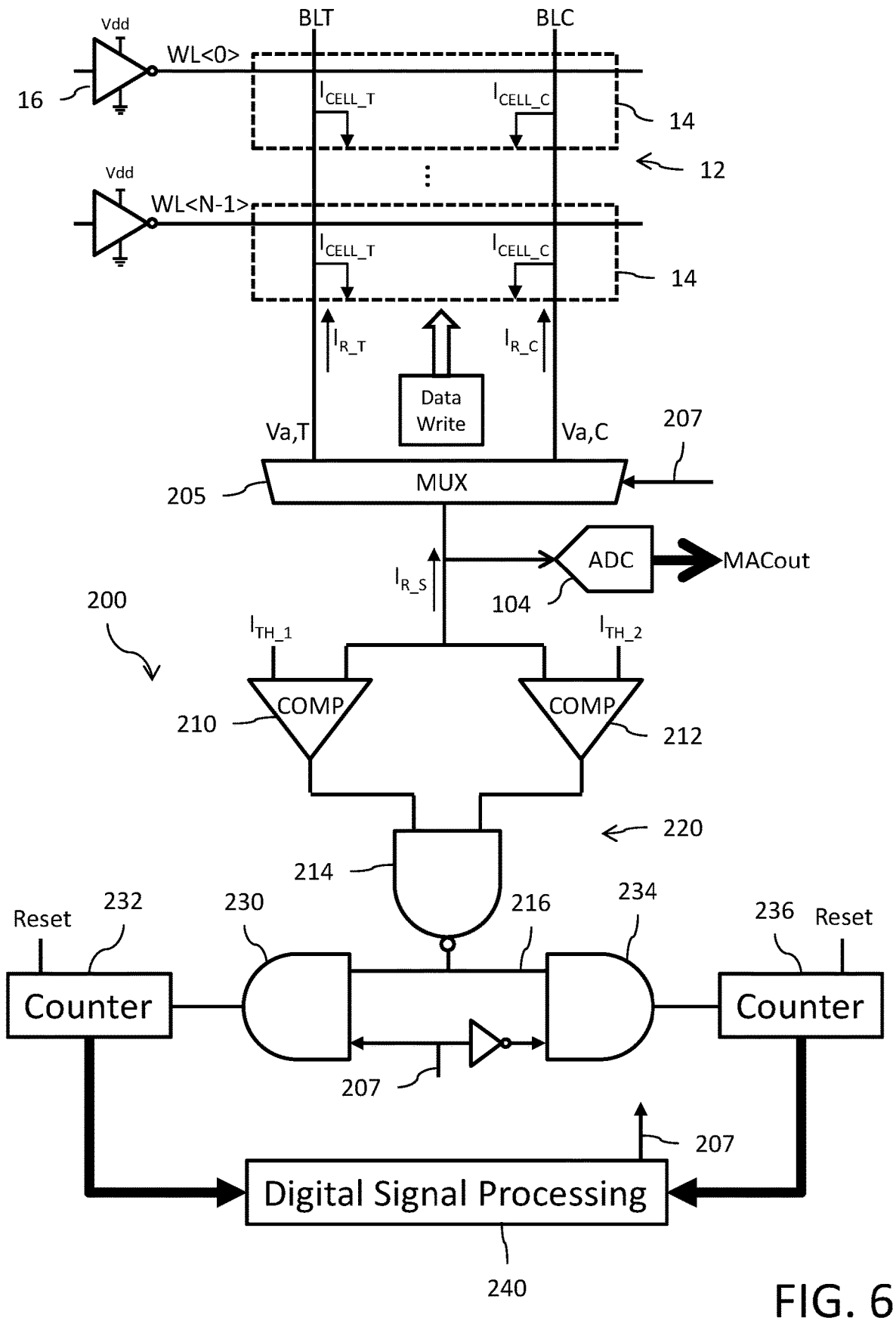
FIG. 6 is a circuit diagram for a testing circuit using bit line current comparison.

Reference is now made to FIG. 6 which shows a circuit diagram for a testing circuit 200 used within the column processing circuit 20 for the purpose of identifying a less variable one of the complementary bit lines BLT, BLC. Like references in FIGS. 1 and 6 refer to like or similar components. The true bit line BLT for a given column of memory cells 14 in the array 12 is coupled, preferably directly connected, to a first input of an analog multiplexer (MUX) circuit 205. Similarly, the complement bit line BLC for that given column of memory cells 14 in the array 12 is coupled, preferably directly connected, to a second input of the analog MUX circuit 205. The analog MUX circuit 205 functions in response to a control signal 207 to select between the true and complement read currents $I_{R\_T}$, $I_{R\_C}$ on the complementary bit lines BLT, BLC for output as a selected read current $I_{R\_S}$. The selected read current $I_{R\_S}$ is applied to the first input of a first current comparator circuit 210 and to the second input of a second current comparator circuit 212. The second input of the first current comparator circuit 210 is configured to receive a first threshold current $I_{TH\_1}$ and the first input of the second current comparator circuit 212 is configured to receive a second threshold current $I_{TH\_2}$. The comparison result output signals from the first and second current comparator circuits 210 and 212 are applied to the inputs of a logic NAND gate 214 whose output generates a trigger signal 216. The combined circuitry of the first and second current comparator circuits 210 and 212 and NAND gate 214 forms a window comparison circuit 220 that functions to determine whether the selected read current $I_{R\_S}$ falls between (i.e., within a window defined by) the first and second threshold currents $I_{TH\_1}$ and $I_{TH\_2}$ (i.e., is $I_{TH\_1} < I_{R\_S} < I_{TH\_2}$ true?), and in response thereto assert the trigger signal 216. Conversely, if the selected read current $I_{R\_S}$ falls outside of the window defined by the first and second threshold currents $I_{TH\_1}$ and $I_{TH\_2}$ (i.e., $I_{TH\_1} > I_{R\_S}$ or $I_{TH\_2} < I_{R\_S}$), the trigger signal 216 is deasserted. The trigger signal 216 is selectively passed by a first pass gate circuit 230 controlled by control signal 207 to a first counter circuit 232, where the count value maintained by the first counter circuit 232 is incremented in response to each assertion of the passed trigger signal 216. The trigger signal 216 is further selectively passed by a second pass gate circuit 234 controlled by a logical inversion of the control signal 207 to a second counter circuit 236, where the count value maintained by the second counter circuit 236 is incremented in response to each assertion of the passed trigger signal 216. The first and second pass gate circuits 230 and 234 may, for example, be implemented using logic AND gates. The count values from the first and second counter circuits 232 and 236 are processed by a digital signal processing (DSP) circuit 240 in order to identify which one of the complementary bit lines BLT, BLC is less variable. In response to this determination, the analog MUX circuit 205 can be controlled through signal 207 to select the less variable one of the complementary bit lines BLT, BLC for connection through MUX 205 to a bit line read circuit formed by analog-to-digital converter (ADC) circuit 104. The ADC circuit 104 will function to sample and convert the analog bit line voltage Va,T or Va,C from the selected less variable one of the complementary bit lines BLT, BLC for conversion to generate a digital output signal MACout representative of a result of the column multiply-accumulate (MAC) for the in-memory compute operation. The digital signals MACout from each column may be output as the Decision from the column processing circuit 20 or combined with each other to generate the Decision.

It will be understood that one test circuit 200 is provided in the column processing circuit 20 for each column of the memory. In an embodiment, the test circuit 200 may comprise a component of a built-in self-test (BIST) circuit.

In an embodiment, the first and second threshold currents $I_{TH\_1}$ and $I_{TH\_2}$ are set to equal plus/minus 15%, for example, of a reference current $I_{REF}$. The reference current $I_{REF}$ is equal to a nominal current value for the memory cell discharge current $I_{CELL}$. In this context, the nominal current is the current when the silicon is centered on a typical process. For testing, this nominal current can be calibrated at any temperature (normally this is done a room temperature) and a typical voltage is used. This value is bitcell dependent, but is otherwise known for a given bitcell.

The same first and second threshold currents $I_{TH\_1}$ and $I_{TH\_2}$ are preferably used by each test circuit 200 across the M columns of the memory array 12.

It will further be noted that conventional row decode, column decode, and read-write circuits known to those skilled in the art, and generally represented in FIG. 6 by a data write circuitry block, are present for use in connection with writing bits to the SRAM cells 14 of the memory array 12 for the test circuit 200.

Operation of the test circuit 200 is as follows: The count values in the first and second counter circuits 232 and 236 are reset. The memory cells 14 of the column are all programmed using the SRAM data write circuitry to a first logic state where a logic 0 state is latched at the true data storage node QT and a logic 1 state is latched at the complement data storage node QC. The complementary bit lines BLT, BLC are precharged to the Vdd voltage level. The control signal 207 is set in a first logic level (for example, logic high) that controls the analog MUX circuit 205 to select the true read current $I_{R\_T}$ on the true bit line BLT for output as the selected read current $I_{R\_S}$ and further actuates the first pass gate circuit 230 to pass the trigger signal 216 to the first counter circuit 232. The word lines WL<0> through WL<N–1> are then sequentially actuated by application of a word line signal to read the logic 0 state from the true data storage node QT of each memory cell 14 of the column. It will be noted that identical pulse widths are used for the word line signals during testing. With each memory cell read, the true read current $I_{R\_T}$ on the true bit line BLT is compared by the window comparison circuit 220 to the window defined by the first and second threshold currents $I_{TH\_1}$ and $I_{TH\_2}$. If the selected read current $I_{R\_S}$ (here that would be the true read current $I_{R\_T}$) falls between the first and second threshold currents $I_{TH\_1}$ and $I_{TH\_2}$ (i.e., is within the window: $I_{TH\_1} < I_{R\_S} < I_{TH\_2}$), the trigger signal 216 is asserted and the first counter 232 increments the first count value. The total of the first count value indicates the number of memory cells 14 programmed at the logic state in the column which contribute a read current $I_R$ on the true bit line BLT falling within the current threshold window (in other words, having an acceptable variation in bit line (read) current).

Following completion of the actuation of the last word line WL<N–1>, the memory cells 14 of the column are all programmed by the SRAM data write circuitry to a second logic state where a logic 1 state is latched at the true data storage node QT and a logic 0 state is latched at the complement data storage node QC. The complementary bit lines BLT, BLC are precharged to the Vdd voltage level. The control signal 207 is set in a second logic level (for example, logic low) that controls the analog MUX circuit 205 to select the complement read current $I_{R\_C}$ on the complement bit line BLC for output as the selected read current $I_{R\_S}$ and further actuates the second pass gate circuit 234 to pass the trigger signal 216 to the second counter circuit 236. The word lines WL<0> through WL<N–1> are then sequentially actuated by application of the word line signal to read the logic 0 state from the complement data storage node QC of each memory cell 14 of the column. Again, the same identical pulse widths are used for the word line signals during testing. With each memory cell read, the complement read current $I_{R\_C}$ on the complement bit line BLC is compared by the window comparison circuit 220 to the first and second threshold currents $I_{TH\_1}$ and $I_{TH\_2}$. If the selected read current $I_{R\_S}$ (here that would be the complement read current $I_R$ c) falls between the first and second threshold currents $I_{TH\_1}$ and $I_{TH\_2}$ (i.e., is within the window: $I_{TH\_1}<I_{R\_S}<I_{TH\_2}$), the trigger signal 216 is asserted and the second counter 236 increments the second count value. The total of the second count value indicates the number of memory cells 14 programmed at the logic 1 state in the column which contribute a read current $I_R$ on the complement bit line BLC falling within the current threshold window (in other words, having an acceptable variation in bit line (read) current).

Following completion of the actuation of the last word line WL<N–1>, the first and second count values are read from the counters 232, 236 by the DSP circuit 240. The DSP circuit 240 then compares the first and second count values. If the first count value is greater than the second count value, then this is indicative of the true bit line BLT being the less variable one of the complementary bit lines BLT, BLC. If the second count value is greater than or equal to the first count value, then this is indicative of the complement bit line BLC being the less variable one of the complementary bit lines BLT, BLC. The DSP circuit 240 then selects the determined less variable one of the complementary bit lines BLT, BLC for subsequent use as the read bit line during in-memory compute operations where simultaneous access of multiple rows of the SRAM array is made. Thus, the bit line voltage Va from the selected less variable bit line will be applied to the input of the ADC circuit 104 for sampling and conversion to generate the MACout signal.

Although the window comparison circuit 220 is shown to assert the trigger signal 216 when the selected read current $I_{R\_S}$ is within the window defined by the first and second threshold currents $I_{TH\_1}$ and $I_{TH\_2}$, it will be understood that the circuitry of the window comparison circuit 220 could instead be designed to assert the trigger signal 216 when the selected read current $I_{R\_S}$ is outside the window (thus indicating presence of an unacceptable variation in bit line (read) current). For this implementation, the counter having the lower count value would instead identify the less variable one of the complementary bit lines BLT, BLC.

Figure 7:
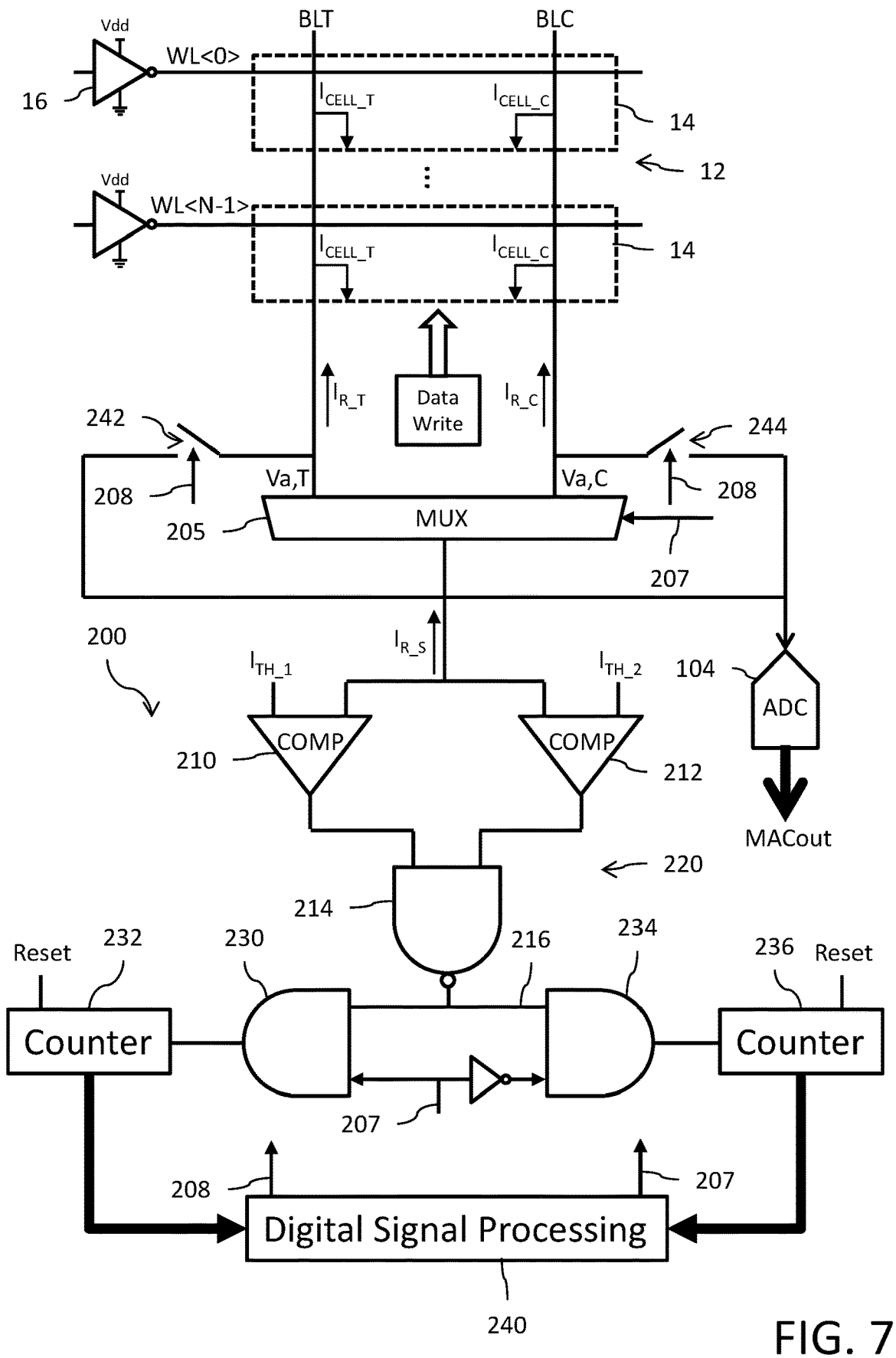
FIG. 7 is a circuit diagram for an alternative embodiment of the testing circuit of FIG. 6.

Reference is now made to FIG. 7 which shows a circuit diagram for the testing circuit 200. Like reference numbers in FIGS. 1, 6 and 7 refer to like or similar components. The circuit of FIG. 7 differs from the circuit of FIG. 6 only with respect to the manner with which the read circuit using ADC circuit 104 is coupled to the bit lines BLT and BLC. The input of the ADC circuit 104 is coupled to the true bit line BLT through a first fuse (or switch) circuit 242 and further coupled to the complement bit line BLC through a second fuse (or switch) circuit 244. In response to the identification of the less variable one of the complementary bit lines BLT, BLC, the DSP circuit 240 controls the first and second fuse (or switch) circuits so that only the read current $I_R$ from the less variable bit line is received by the ADC circuit 104. For example, if implemented using fuses, the DSP circuit 240 can blow the fuse circuit associated with the more variable bit line connection using signal 208. Conversely, if implemented using switches, the DSP circuit 240 can actuate (close) the switch circuit for the less variable bit line connection using signal 208.

Figure 8:
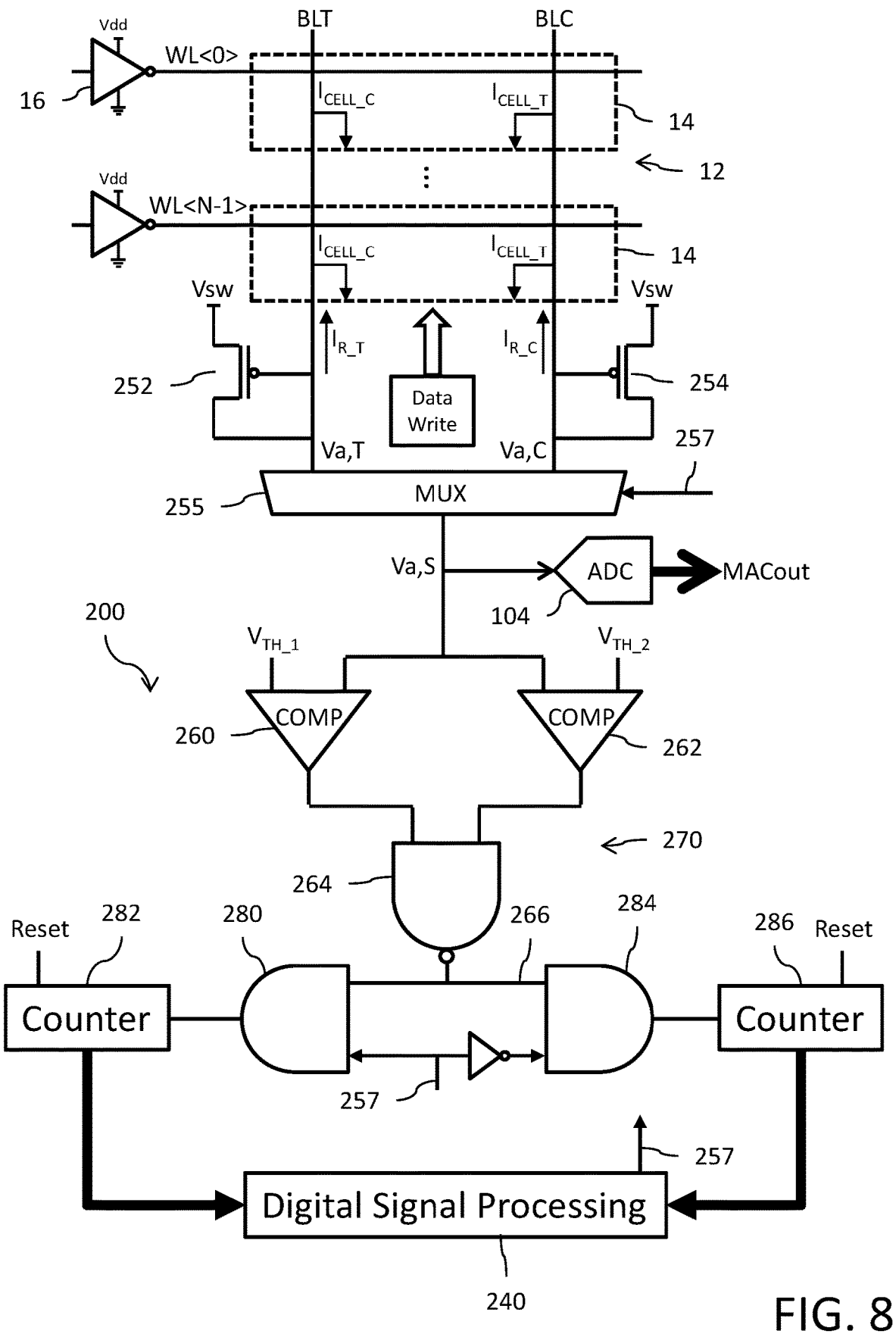
FIG. 8 is a circuit diagram for a testing circuit using bit line voltage comparison.

The implementations of FIGS. 6 and 7 perform a current comparison in connection with making the identification of the less variable one of the complementary bit lines BLT, BLC. It will be understood, however, that a voltage comparison may also be used. An embodiment of the test circuit 200 using voltage comparison is shown in FIG. 8. Like reference numbers in FIGS. 1, 6 and 8 refer to like or similar components. The true bit line BLT for a given column of memory cells 14 in the array 12 is coupled, preferably directly connected, to a first input of an analog multiplexer (MUX) circuit 255. A first diode-connected p-channel MOS transistor 250 has a source terminal coupled, preferably directly connected, to a switchable voltage supply node Vsw and a gate terminal and drain terminal coupled, preferably directly connected, to the true bit line BLT. Similarly, the complementary bit line BLC for that given column of memory cells 14 in the array 12 is coupled, preferably directly connected, to a second input of the analog MUX circuit 205. A second diode-connected p-channel MOS transistor 252 has a source terminal coupled, preferably directly connected, to the switchable voltage supply node Vsw and a gate terminal and drain terminal coupled, preferably directly connected, to the complement bit line BLC. The analog MUX circuit 255 functions in response to a control signal 257 to select between the true and complement bit line voltages Va,T, Va,C on the complementary bit lines BLT, BLC for output as a selected read voltage Va,S. The selected read voltage Va,S is applied to the first input of a first voltage comparator circuit 260 and to the second input of a second voltage comparator circuit 262. The second input of the first voltage comparator circuit 260 is configured to receive a first threshold voltage $V_{TH\_1}$ and the first input of the second voltage comparator circuit 262 is configured to receive a second threshold voltage $V_{TH\_2}$. The comparison result output signals from the first and second voltage comparator circuits 260 and 262 are applied to the inputs of a logic NAND gate 264 whose output generates a trigger signal 266. The combined circuitry of the first and second voltage comparator circuits 260 and 262 and NAND gate 264 forms a window comparison circuit 270 that functions to determine whether the selected read voltage $V_{R\_S}$ falls between (i.e., within a window defined by) the first and second threshold voltages $V_{TH\_1}$ and $V_{TH\_2}$ (i.e., is $V_{TH\_1}<Va,S<V_{TH\_2}$ true?), and in response thereto assert the trigger signal 266. Conversely, if the selected read voltage Va,S falls outside of window defined by the first and second threshold voltages $V_{TH\_1}$ and $V_{TH\_2}$ (i.e., $V_{TH\_1}>Va,S$ or $V_{TH\_2}<Va,S$), the trigger signal 266 is deasserted. The trigger signal 266 is selectively passed by a first pass gate circuit 280 controlled by control signal 257 to a first counter circuit 282, where the count value maintained by the first counter circuit 282 is incremented in response to assertion of the passed trigger signal 266. The trigger signal 266 is further selectively passed by a second pass gate circuit 284 controlled by a logical inversion of the control signal 257 to a second counter circuit 286, where the count value maintained by the second counter circuit 286 is incremented in response to assertion of the passed trigger signal 266. The first and second pass gate circuits 280 and 284 may, for example, be implemented using logic AND gates. The count values from the first and second counter circuits 282 and 286 processed by a digital signal processing (DSP) circuit 240 in order to identify which one of the complementary bit lines BLT, BLC is less variable. In response to this determination, the analog MUX circuit 255 can be controlled through signal 257 to select the less variable one of the complementary bit lines BLT, BLC for connection to a bit line read circuit formed by analog-to-digital converter (ADC) circuit 104. The ADC circuit 104 will function to convert the analog bit line voltage Va,T or Va,C from the selected less variable one of the complementary bit lines BLT, BLC for conversion to generate a digital output signal MACout representative of a result of the column multiply-accumulate (MAC) for the in-memory compute operation. The digital signals MACout from each column may be output as the Decision from the column processing circuit 20 or combined with each other to generate the Decision.

The switchable voltage supply node Vsw applies a positive voltage to the source terminals of transistors 252 and 254 only during testing operation. Otherwise, the switchable voltage supply node Vsw is left floating.

It will be understood that one test circuit 200 is provided in the column processing circuit 20 for each column of the memory. In an embodiment, the test circuit 200 may comprise a component of a built-in self-test (BIST) circuit.

Figure 10:
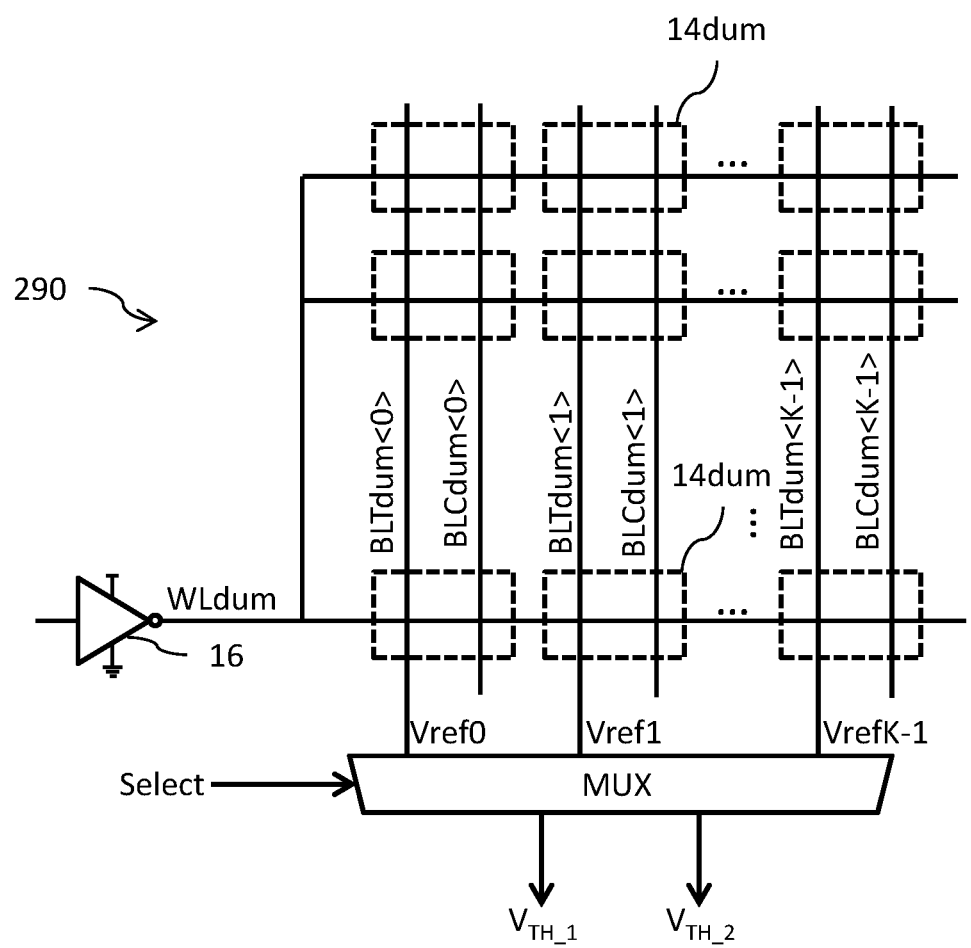
FIG. 10 is a circuit diagram of a threshold voltage generator circuit for the circuit of FIG. 8.

In an embodiment, the first and second threshold voltages $V_{TH\_1}$ and $V_{TH\_2}$ are set by a voltage threshold generator circuit 290 that is formed by a plurality of replica columns of memory cells (see, FIG. 10). A multiplexer circuit is controlled to select two of the generated reference voltages Vref0 to VrefM−1 for application as the first and second threshold voltages $V_{TH\_1}$ and $V_{TH\_2}$.

The same first and second threshold voltages $V_{TH\_1}$ and $V_{TH\_2}$ are preferably used by each test circuit 200 across the M columns of the memory array 12.

It will further be noted that conventional row decode, column decode, and read-write circuits known to those skilled in the art, and generally represented in FIG. 8 by a data write circuitry block, are present for use in connection with writing bits to the SRAM cells 14 of the memory array 12 for the test circuit 200.

Operation of the test circuit 200 is as follows: The count values in the first and second counter circuits 282 and 286 are reset. The memory cells 14 of the column are all programmed by data write circuitry to a first logic state where a logic 0 state is latched at the true data storage node QT and a logic 1 state is latched at the complement data storage node QC. The complementary bit lines BLT, BLC are precharged to the Vdd voltage level. The control signal 257 is set in a first logic level (for example, logic high) that controls the analog MUX circuit 255 to select the true read voltage Va,T on the true bit line BLT for output as the selected read voltage Va,S and further actuates the first pass gate circuit 280 to pass the trigger signal 266 to the first counter circuit 282. The word lines WL<0> through WL<N−1> are then sequentially actuated by word line signals to read the logic 0 state from the true data storage node QT of each memory cell 14 of the column. It will be noted that identical pulse widths are used for the word line signals during testing. With each memory cell read, the true read voltage Va,T on the true bit line BLT is compared by the window comparison circuit 270 to the first and second threshold voltages $V_{TH\_1}$ and $V_{TH\_2}$. If the selected read voltage Va,S (here that would be the true read voltage Va,T) falls between the first and second threshold voltages $V_{TH\_1}$ and $V_{TH\_2}$ (i.e., is within the window: $V_{TH\_1}<Va,S<V_{TH\_2}$), the trigger signal 266 is asserted and the first counter 282 increments the first count value. The total of the first count value indicates the number of memory cells 14 programmed at the logic 0 state in the column which contribute a read voltage Va on the true bit line BLT falling within the voltage threshold window (in other words, having an acceptable variation in bit line (read) current).

Following completion of the actuation of the last word line WL<N−1>, the memory cells 14 of the column are all programmed by the data write circuitry to a second logic state where a logic 1 state is latched at the true data storage node QT and a logic 0 state is latched at the complement data storage node QC. The complementary bit lines BLT, BLC are precharged to the Vdd voltage level. The control signal 257 is set in a second logic level (for example, logic low) that controls the analog MUX circuit 255 to select the complement read voltage Va,C on the complement bit line BLC for output as the selected read voltage Va,S and further actuates the second pass gate circuit 284 to pass the trigger signal 266 to the second counter circuit 286. The word lines WL<0> through WL<N−1> are then sequentially actuated by word line signals to read the logic 0 state from the complement data storage node QC of each memory cell 14 of the column. Again, the same identical pulse widths are used for the word line signals. With each memory cell read, the complement read voltage Va,C on the complement bit line BLC is compared by the window comparison circuit 270 to the first and second threshold voltages $V_{TH\_1}$ and $V_{TH\_2}$. If the selected read voltage Va,S (here that would be the complement read voltage Va,C) falls between the first and second threshold voltages $V_{TH\_1}$ and $V_{TH\_2}$ (i.e., is within the window: $V_{TH\_1}<Va,C<V_{TH\_2}$), the trigger signal 266 is asserted and the second counter 286 increments the second count value. The total of the second count value indicates the number of memory cells 14 programmed at the logic 1 state in the column which contribute a read voltage Va on the complement bit line BLC falling within the voltage threshold window (in other words, having an acceptable variation in bit line (read) current).

Following completion of the actuation of the last word line WL<N−1>, the first and second count values are read from the counters 282, 286 by the DSP circuit 240. The DSP circuit 240 then compares the first and second count values. If the first count value is greater than the second count value, then this is indicative of the true bit line BLT being the less variable one of the complementary bit lines BLT, BLC. If the second count value is greater than or equal to the first count value, then this is indicative of the complement bit line BLC being the less variable one of the complementary bit lines BLT, BLC. The DSP circuit 240 then selects the determined less variable one of the complementary bit lines BLT, BLC for subsequent use as the read bit line during in-memory compute operations where simultaneous access of multiple rows of the SRAM array is made. Thus, the bit line voltage Va from the selected less variable bit line will be applied to the input of the ADC circuit 104 for sampling and conversion to generate the MACout signal.

Although the window comparison circuit 270 is shown to assert the trigger signal 266 when the selected read voltage Va,S is within the window defined by the first and second threshold voltages $V_{TH\_1}$ and $V_{TH\_2}$, it will be understood that the circuitry of the window comparison circuit 270 could instead be designed to assert the trigger signal 266 when the selected read voltage Va,S is outside the window (thus indicating presence of an unacceptable variation in bit line (read) current). For this implementation, the counter having the lower count value would instead identify the less variable one of the complementary bit lines BLT, BLC.

Figure 9:
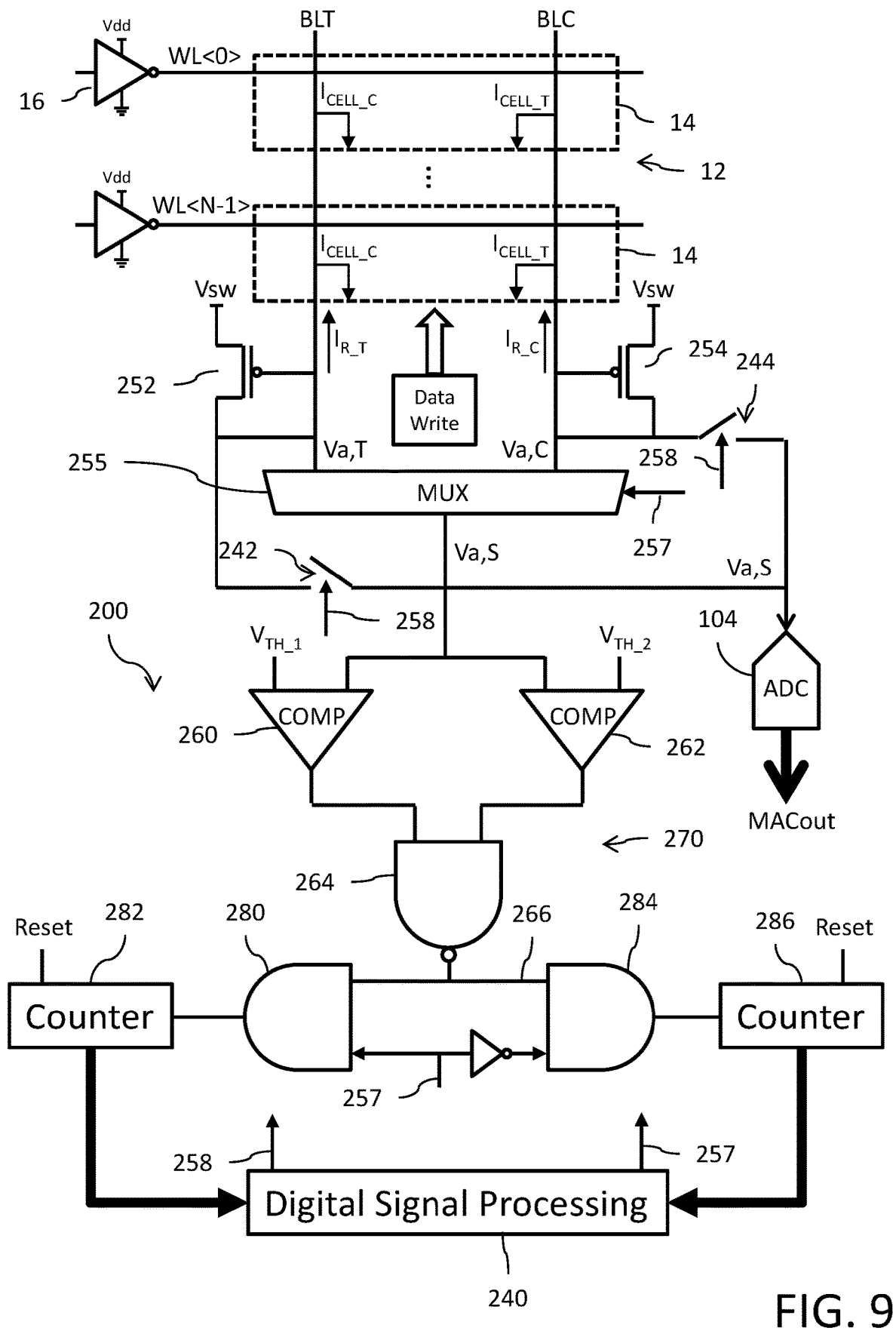
FIG. 9 is a circuit diagram for an alternative embodiment of the testing circuit of FIG. 8.

Reference is now made to FIG. 9 which shows a circuit diagram for the testing circuit 200. Like reference numbers in FIGS. 1, 8 and 9 refer to like or similar components. The circuit of FIG. 9 differs from the circuit of FIG. 8 only with respect to the manner with which the read circuit using ADC circuit 104 is coupled to the bit lines BLT and BLC. The input of the ADC circuit 104 is coupled to the true bit line BLT through a first fuse (or switch) circuit 242 and further coupled to the complement bit line BLC through a second fuse (or switch) circuit 244. In response to the identification of the less variable one of the complementary bit lines BLT, BLC, the DSP circuit 240 controls the first and second fuse (or switch) circuits so that only the read voltage Va,S from the less variable bit line is received by the ADC circuit 104. For example, if implemented using fuses, the DSP circuit 240 can blow the fuse circuit associated with the more variable bit line connection using signal 258. Conversely, if implemented using switches, the DSP circuit 240 can actuate (close) the switch circuit for the less variable bit line connection using signal 258.

FIG. 10 shows a circuit diagram for the voltage threshold generator circuit 290 that is formed by a plurality of dummy (dum) columns of memory cells 14dum. All rows of cells 14dum are driven by a common word line (WLdum) signal. Columns of the cells 14dum share a common pair of complementary bit lines (BLTdum, BLCdum). In this implementation, the true bit lines BLTdum<0>, ..., BLTdum<K−1> are coupled to the inputs of a multiplexer circuit (MUX). A corresponding reference voltage Vref0, ..., VrefK−1 is generated on the true bit lines BLTdum<0>, ..., BLTdum<K−1>, respectively, and the multiplexer circuit MUX operates to select the first and second threshold voltages $V_{TH\_1}$ and $V_{TH\_2}$ from amongst the reference voltages Vref0, ..., VrefK−1.

The reference voltages Vref0, ..., VrefK−1 are generated with respect to typical silicon and within a certain threshold of typical memory cell current. This is managed by having a column with predefined (i.e., programmed to the logic 0 state) dummy memory cells 14dum that are bit line load controlled by the dummy word line WLdum. The pulse width of the word line signal on the dummy word line WLdum is equal to the word line pulse width used for testing cell discharge current $I_{CELL}$ variation. The dummy word line signal can be generated in each run of the testing, or can be generated once if the reference voltage levels are not sensitive to noise.

Take, for example, the situation where Vref0=0.75 Vref is desired to be generated and applied to the multiplexing circuit MUX for possible selection (Vref being the typical discharge voltage level). The true bit line BLTdum<0> can include three discharge (i.e., logic 0 programmed) memory cells 14dum and the load of the bit line BLTdum<0> is kept at four times the actual bit line. This means that a discharge rate of 0.75× versus a typical discharge with one bitcell will occur to generate the voltage Vref0. The use of discharge memory cells in larger counts ensures low variation on the discharge current and centering around the typical. It is preferred to use of a count of three or more bitcells for this purpose. The result is a discharge rate that is proportional to the number of discharge cells and inversely proportional to load.

Other Vref values can be generated in other columns using the same technique. The multiplexer circuit MNUX then selects two of those Vref values for the first and second threshold voltages $V_{TH\_1}$ and $V_{TH\_2}$.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An in-memory computation circuit, comprising:
   a memory array including a plurality of memory cells arranged in a matrix with plural rows and plural columns, each row including a word line connected to the memory cells of the row, and each column including a first bit line and second bit line connected to the memory cells of the column;
   a word line driver circuit for each row having an output connected to drive the word line of the row;
   a row controller circuit configured to simultaneously actuate the plurality of word lines by applying pulses through the word line driver circuits to the word lines in response to feature data for an in-memory compute operation; and
   a column processing circuit including a read circuit coupled to the first and second bit lines, wherein each read circuit comprises:
      a first sensing circuit comprising a first analog-to-digital converter circuit configured to convert a first bit line signal generated on the first bit line in response to the in-memory compute operation and generate a first digital signal;
      a second sensing circuit comprising a second analog-to-digital converter circuit configured to convert a second bit line signal generated on the second bit line in response to the in-memory compute operation and generate a second digital signal; and
      a digital signal processing circuit configured to average the first and second digital signals to generate an output signal indicative of a result of the in-memory compute operation.

2. The circuit of claim 1, wherein the first and second bit lines are complementary bit lines coupled to the memory cells of the column.

3. The circuit of claim 1, wherein the first analog-to-digital converter circuit is configured to implement a first analog-to-digital encoding operation in response to the first bit line signal, wherein the second analog-to-digital converter circuit is configured to implement a second analog-to-digital encoding operation in response to the second bit line signal, and wherein the second analog-to-digital encoding operation is a logical inversion of the first analog-to-digital encoding operation.

4. An in-memory computation The circuit of claim 1, comprising:
   a memory array including a plurality of memory cells arranged in a matrix with plural rows and plural columns, each row including a word line connected to the memory cells of the row, and each column including a first bit line and second bit line connected to the memory cells of the column;
   a word line driver circuit for each row having an output connected to drive the word line of the row;
   a row controller circuit configured to simultaneously actuate the plurality of word lines by applying pulses through the word line driver circuits to the word lines in response to feature data for an in-memory compute operation; and
   a column processing circuit including a read circuit coupled to the first and second bit lines, wherein each read circuit comprises:
      an analog-to-digital converter circuit selectively coupled to the first and second bit lines to receive first and second bit line signals, respectively, using a multiplexer circuit and configured to:

convert the first bit line signal generated on the first bit line in response to the in-memory compute operation and generate a first digital sense signal; and convert the second bit line signal generated on the second bit line in response to the in-memory compute operation and generate a second digital sense signal; and a digital signal processing circuit configured to average the first and second digital signals to generate an output signal indicative of a result of the in-memory compute operation.

5. The circuit of claim 4, wherein said analog-to-digital converter circuit is configured to implement a first analog-to-digital encoding operation in response to the first bit line signal and implement a second analog-to-digital encoding operation in response to the second bit line signal, and wherein the second analog-to-digital encoding operation is a logical inversion of the first analog-to-digital encoding operation.

6. The circuit of claim 4, wherein the first and second bit lines are complementary bit lines coupled to the memory cells of the column.

7. A read method for an in-memory computation circuit, including: a memory array including a plurality of memory cells arranged in a matrix with plural rows and plural columns, each row including a word line connected to the memory cells of the row, and each column including a first bit line and second bit line connected to the memory cells of the column; a word line driver circuit for each row having an output connected to drive the word line of the row; and a row controller circuit configured to simultaneously actuate the plurality of word lines by applying pulses through the word line driver circuits to the word lines in response to feature data for an in-memory compute operation, said read method comprising:

performing a first analog-to-digital conversion of a first bit line signal generated on the first bit line in response to the in-memory compute operation to generate a first digital signal;

performing a second analog-to-digital conversion of a second bit line signal generated on the second bit line in response to the in-memory compute operation to generate a second digital signal; and averaging the first and second digital signals to generate an output signal indicative of a result of the in-memory compute operation.

8. The method of claim 7, wherein the first and second bit lines are complementary bit lines coupled to the memory cells of the column.

9. The method of claim 7, wherein the first analog-to-digital conversion is performed using a first encoding operation in response to the first bit line signal, wherein the second analog-to-digital conversion is performed using a second encoding operation in response to the second bit line signal, and wherein the second analog-to-digital encoding operation is a logical inversion of the first analog-to-digital encoding operation.

10. A read method for an in-memory computation circuit, including: a memory array including a plurality of memory cells arranged in a matrix with plural rows and plural columns, each row including a word line connected to the memory cells of the row, and each column including a first bit line and second bit line connected to the memory cells of the column; a word line driver circuit for each row having an output connected to drive the word line of the row; and a row controller circuit configured to simultaneously actuate the plurality of word lines by applying pulses through the word line driver circuits to the word lines in response to feature data for an in-memory compute operation, the method comprising:

selecting the first bit line signal;

performing a first analog-to-digital conversion using an analog-to-digital converter circuit to generate a first digital signal;

performing a second analog-to-digital conversion using said analog-to-digital converter circuit to generate a second digital signal; and averaging the first and second digital signals to generate an output signal indicative of a result of the in-memory compute operation.

11. The method of claim 10, wherein said analog-to-digital converter circuit implements a first analog-to-digital encoding operation when converting the first bit line signal and implements a second analog-to-digital encoding operation when converting the second bit line signal, and wherein the second analog-to-digital encoding operation is a logical inversion of the first analog-to-digital encoding operation.

12. The method of claim 10, wherein the first and second bit lines are complementary bit lines coupled to the memory cells of the column.

* * * * *